United States Patent
Püttmer

(10) Patent No.: US 8,429,951 B2
(45) Date of Patent: Apr. 30, 2013

(54) DIAGNOSTIC SYSTEM AND DIAGNOSTIC METHOD FOR A VALVE, PARTICULARLY A CLOSING VALVE OR A CONTROL VALVE

(75) Inventor: Alf Püttmer, Karlsruhe (DE)

(73) Assignee: Siemens AG, Munich (DE)

( * ) Notice: Subject to any disclaimer, the term of this patent is extended or adjusted under 35 U.S.C. 154(b) by 421 days.

(21) Appl. No.: 12/679,602

(22) PCT Filed: Sep. 23, 2008

(86) PCT No.: PCT/EP2008/062702
§ 371 (c)(1),
(2), (4) Date: Mar. 23, 2010

(87) PCT Pub. No.: WO2009/040349
PCT Pub. Date: Apr. 2, 2009

(65) Prior Publication Data
US 2010/0192677 A1  Aug. 5, 2010

(30) Foreign Application Priority Data
Sep. 24, 2007 (DE) .......................... 10 2007 045 529

(51) Int. Cl.
*G01M 3/04* (2006.01)
(52) U.S. Cl.
USPC ...................................................... 73/40.5 A
(58) Field of Classification Search ................ 73/40.5 A
See application file for complete search history.

(56) References Cited

U.S. PATENT DOCUMENTS

| 2002/0062682 | A1 | 5/2002 | Kumpfmueller | 73/40.5 A |
| 2003/0019297 | A1 | 1/2003 | Fiebelkorn et al. | 73/587 |
| 2005/0126639 | A1* | 6/2005 | Ens et al. | 137/554 |
| 2008/0092632 | A1* | 4/2008 | Hoffmann et al. | 73/40.5 A |

FOREIGN PATENT DOCUMENTS

| CA | 2 129 470 | 2/1995 |
| DE | 199 24 377 | 12/2000 |
| DE | 199 47 129 | 4/2001 |
| EP | 0 637 713 | 2/1995 |

* cited by examiner

*Primary Examiner* — Peter Macchiarolo
*Assistant Examiner* — Tamiko Bellamy
(74) *Attorney, Agent, or Firm* — Cozen O'Connor

(57) ABSTRACT

A diagnostic system and a diagnostic method for a valve, particularly a closing valve or a control valve, which is actuatable by a drive and is installed in a pipeline. Using a sensor, the pressures in the inlet side of the pipeline are detected and compared with a first reference value in an evaluation device while the valve is closed. The solid-borne sound level is measured using a sensor, and compared with a second reference value in the evaluation device. A signal for displaying leakage exceeding the allowable amount is output if the sound level exceeds the second reference value and if the pressure in the inlet side is smaller than or equal to the first reference value. A characteristic curve field is used to determine the first reference value of the pressure, the parameters thereof being the Kv value and the leakage class of the valve.

12 Claims, 3 Drawing Sheets

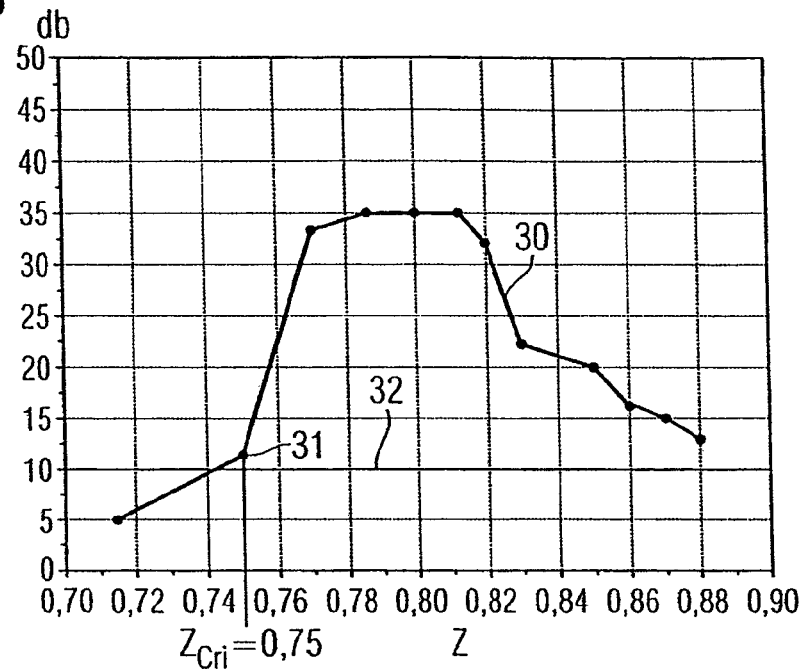
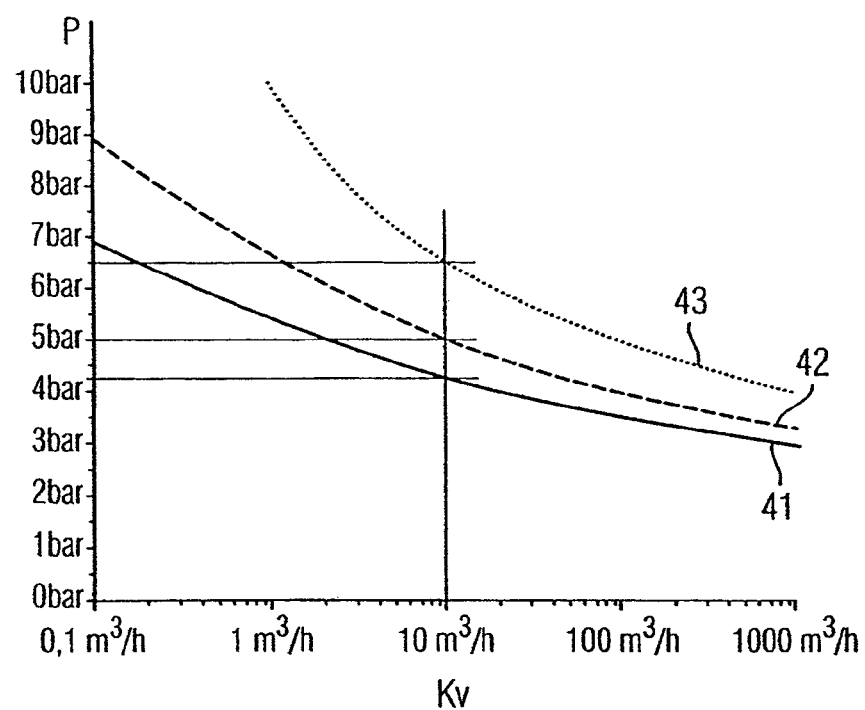

DIAGNOSTIC SYSTEM AND DIAGNOSTIC METHOD FOR A VALVE, PARTICULARLY A CLOSING VALVE OR A CONTROL VALVE

CROSS-REFERENCE TO RELATED APPLICATION

This is a U.S. national stage of International Application No. PCT/EP2008/062702, filed on 23 Sep. 2008. Priority is claimed on German Application No. 10 2007 045 529.3, filed 24 Sep. 2007.

BACKGROUND OF THE INVENTION

The invention relates to a diagnostic system for a valve and, more particularly, to a closing valve or a control valve, which can be actuated by a drive and installed in a pipeline, and to a diagnostic method, which can be executed with the diagnostic system.

In many areas of process engineering and power engineering, the trouble-free operation of a plant depends on the flawless functioning of the control, check, closing and regulating valves used. To avoid costly irregular operational interruptions, any valve damage should, where possible, be detected early, i.e., before a valve failure can cause the plant to be shut down. Defective valve seats cause, for example, leakage flows or leaks, which emit broadband noise. Recording and evaluating the sound emission of a valve can thus be used for early detection of valve damage. Since valve damage can lead to errors and expensive follow-up costs, a diagnosis, possibly with automatic detection and programmable evaluation of the errors, is of great benefit. Statistical evaluations of the diagnostic data can be used to optimize maintenance processes to ensure a timely replacement of a faulty valve and to qualitatively evaluate and classify valve manufacturers or to evaluate the suitability of specific valves for different process types.

DE 199 24 377 A1 discloses a diagnostic system for a valve that can be actuated by a position regulator through a drive. This diagnostic system has a facility for detecting, storing and evaluating solid-borne sound spectra measured at the valve. To enable a particularly reliable valve diagnosis, a solid-borne sound spectrum detected with a slightly open intact valve can be stored in the detection, storage and evaluation facility. For diagnosis purposes, a solid-borne sound spectrum detected with the valve closed is compared with the stored spectrum, and the similarity is used as a criterion for the lack of leak tightness of the valve.

DE 199 47 129 A1 discloses a further diagnostic system for a valve. The possibilities cited for attaching a sensor for solid-borne sound are the outer wall of the valve housing, the yoke between the valve housing and drive, the connecting flange between the yoke and housing, the flanges between the housing and pipeline and the valve stems. A measurement signal, supplied by the sound sensor, is fed to an evaluation facility, which is located in the housing of the valve position regulator or can be disposed separately from the housing of the valve position regulator. One problem here is that the sound sensor supplies a measurement signal with a relatively low sound level, which can only be transmitted without interference to the evaluation facility with a certain outlay.

Alternatively, it is possible to dispose the sensor in or on the housing of the evaluation facility, which is then connected to the valve in a sound-conducting manner. This has the advantage that the short distance between the evaluation facility and the sensor means that relatively short connecting lines are required. An exemplary electrical measurement signal is therefore subject to only minor attenuation on the transmission path and can be protected against the coupling in of interference without major outlay because of the small spatial dimensions. The diagnostic system can also be fitted particularly easily on a valve, because there is no need to lay cables outside the housing of the evaluation facility or to separately fit the sensor for solid-borne sound to the valve. Ultrasound emissions, which occur predominantly in the region of the closing body, are coupled into the sound sensor as sound signals by the valve housing, a flange generally disposed between the valve housing and a yoke, and by the yoke itself, where the sound sensor is generally located in or on the housing of the evaluation facility, which is generally screwed onto the yoke. The measurement signal therefore reaches the housing of the evaluation facility in acoustic form rather than electrical form, with acoustic/electrical signal conversion being performed with the solid-borne sound sensor in the housing.

The known diagnostic systems share a common feature in that the diagnosis can only be made based on a relatively complex analysis of the recorded solid-borne sound signal and that they can only be used to determine the presence of a leak. The known diagnostic systems do not, however, allow a quantitative analysis of the leak.

SUMMARY OF THE INVENTION

It is therefore an object of the invention to create a diagnostic system and a diagnostic method for a valve, particularly a closing valve or control valve, which can be actuated by a drive and installed in a pipeline, which allow the identification of leakage that exceeds a permissible value when the valve is in the installed state and in the process have no need for complex analysis of the solid-borne sound signal, for example, using Fourier analysis.

This and other objects and advantages are achieved in accordance with the invention by a system and method which takes advantage of the knowledge that in the event of leakage, cavitation occurs, as in normal operation of the valve with fluids beyond a certain differential pressure ratio Z. Here, differential pressure ratio Z is calculated approximately in accordance with the formula:

$$Z = \frac{p1 - p2}{p1 - pv},$$

where
p1—pressure on the inlet side of the valve,
p2—pressure on the outlet side, and
pv—vapor pressure of the fluid.

During the transition from a turbulent flow to a flow in which cavitation occurs, as can be produced by a rise in the differential pressure, solid-borne sound emission increases suddenly. It has been determined by empirical measurements using different leakage throughflow quantities that a critical differential pressure ratio $Z_{Cri}$, on the exceeding of which cavitation occurs, moves in the direction of smaller values as the size of the leakage increases. In other words the greater the leakage throughflow, the smaller the critical differential pressure ratio, beyond which cavitation occurs and based on which solid-borne sound emissions can be determined. If it is assumed that the pressure on the outlet side and the vapor pressure of the fluid are constant, this also means that cavitation can be detected acoustically on the inlet side at a lower test pressure. The permissible leakage is a function of the Kv value and the leakage class of the valve. Consequently, the critical differential pressure ratio is essentially also a function of these parameters. It can be determined that the permissible leakage has been exceeded, if the occurrence of cavitation can be determined acoustically when the pressure on the inlet side is lower than the test pressure corresponding to the critical differential pressure ratio. There is therefore a link between the valve parameters, specifically the leakage class and the Kv value, and a test pressure, up to which no cavitation should be determined by the solid-borne sound measurement while there is compliance with the leakage class.

A first pressure reference value can be defined particularly simply, if it is determined automatically by the evaluation facility based on a characteristic curve field stored in the storage unit, the parameters of which are as a minimum the Kv value of the valve and the leakage class of the valve. Both parameters are generally available in the valve specification and can be set manually by an input keyboard during commissioning of the diagnostic system for example. The Kv value of the valve, which is frequently also referred to as the throughflow factor or throughflow coefficient, represents a measure of the achievable throughput or throughflow of a fluid or gas through the valve. It is therefore specified in $m^3/h$ and is used to select or dimension the valve. Valves are classified in six different leakage classes based on their leak tightness in the closed state according to the standards ANSI/FCI 70-2 and IEC 60534-4. For example, in leakage class II a leakage of 0.5% of the Kv value is permissible, in class III a leakage of 0.1% and in leakage class IV a leakage of 0.01%. If a valve no longer complies with the threshold values of its leakage class, it means that it is no longer performing its checking function to an adequate degree and the valve or its trim has to be replaced by a new one with a known leakage class.

As mentioned above, solid-borne sound emission rises suddenly with the onset of cavitation. As the pressure rises on the inlet side of the valve, the sound level initially increases slowly, as long as the flow in the valve is turbulent. With the onset of cavitation, the rise suddenly becomes steeper, so that a clearly identifiable knee point appears in the sound level curve. The solid-borne sound level, which supervenes at this knee point, can be defined reliably and is preferably determined specifically for the application during commissioning of the valve, as it is a function of the respective installation conditions. It is therefore possible, with a reference value that corresponds essentially to this sound level, to distinguish reliably between a turbulent flow and a flow having cavitation.

Other objects and features of the present invention will become apparent from the following detailed description considered in conjunction with the accompanying drawings. It is to be understood, however, that the drawings are designed solely for purposed of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described therein.

BRIEF DESCRIPTION OF THE DRAWINGS

The invention along with embodiments and advantages are described in more detail below based on the drawings showing an exemplary embodiment of the invention, in which:

FIG. 3 shows a graphical plot of a sound level diagram;

FIG. 4 shows a graphical plot of a characteristic curve field for determining a first reference value.

DETAILED DESCRIPTION OF THE PREFERRED EMBODIMENTS

Figure 1:
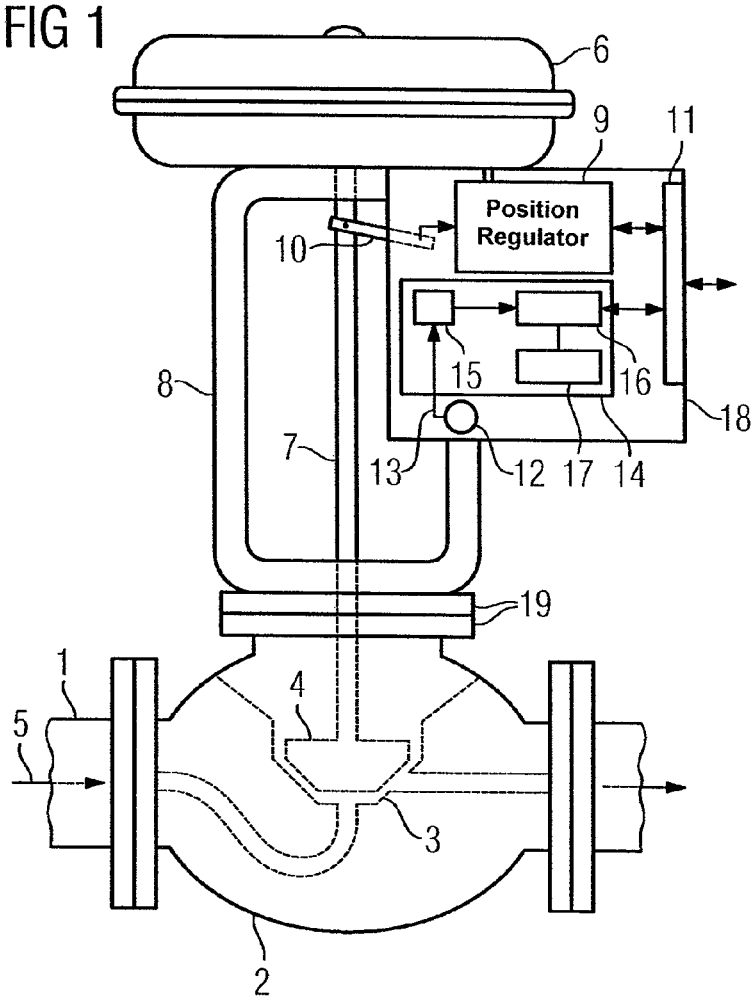
FIG. 1 shows in outline form the structure of a control valve with evaluation facility.

With specific reference to FIG. 1, a valve 2 is shown installed in a pipeline 1 of a process engineering plant (not shown in detail in FIG. 1), where the valve 2 controls the throughflow of a medium 5 bby a corresponding lift of a closing body 4 interacting with a valve seat 3. The lift is generated by a pneumatic drive 6 and is transmitted by a valve stem 7 to the closing body 4. The drive 6 is connected by a yoke 8 to the housing of the valve 2. Attached to the yoke 8 is a position regulator 9, which detects the lift on the input side by a connecting piece engaging with the valve stem 7, compares the lift with a setpoint value supplied by a field bus through a data interface 11 and controls the pneumatic drive 6 on the output side to correct the deviation. A sensor 12 for solid-borne sound is integrated in a securing screw. A measurement signal 13 from the sensor 12 is fed to a facility 14 for evaluating the recorded measurement signal. The facility 14 contains a signal processing circuit 15, in which the measurement signal 13 of the sound sensor 12 is amplified, filtered and digitized. The sound level is determined from the processed signal 13 in a downstream computation unit 16. A first reference value of the pressure and a second reference value of the solid-borne sound level are stored in a storage unit 17. A characteristic curve field is also stored in the storage unit 17, which is used to automatically determine the first reference value of the pressure as a function of the Kv value, the leakage class of the valve and the pressure in the outlet side of the pipeline, if the pressing in the outlet side of the pipeline is different from atmospheric ambient pressure. The valve diagnosis is performed periodically or is prompted by the data interface 11, by which the diagnosis result can also be output. A value of the pressure on the inlet side required for the diagnosis is supplied to the evaluation facility 14 by an upstream pressure transducer (not shown in FIG. 1) through the data interface 11. The position regulator 9, sensor 12 and evaluation facility 14 are disposed in a common housing 18, which is equipped with a pressure-tight encapsulation for use in areas where there is a risk of explosion. This avoids the need for externally laid connecting cables between the electronic components of the control valve. Solid-borne sound produced by any leakage flows that may be present passes through the housing of the valve 2, a flange connection 19 between the housing of the valve 2 and the yoke 8 and through the yoke 8 itself to the sensor 12, which is configured as a securing screw, as described above, and therefore allows the solid-borne sound conducted through the yoke 8 to be coupled in effectively.

Figure 2:
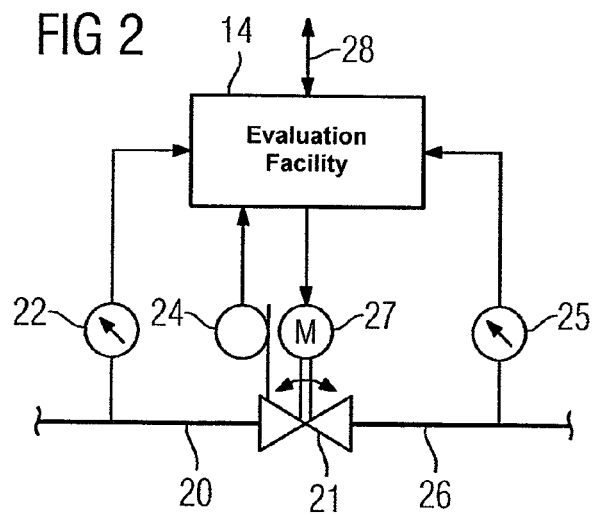
FIG. 2 shows a schematic block diagram of a configuration of the valve in a pipeline.

FIG. 2 shows a basic circuit diagram of a section of plant with a diagnostic system. The prevailing pressure is measured with a sensor 22 in an inlet side 20 of the pipeline, in which a valve 21 is installed, and transmitted to an evaluation facility 14. A sensor 24 for solid-borne sound is attached to the valve 21 and supplies a measurement signal of the solid-borne sound to the evaluation facility 14. This is captured with a sensor 25 for the pressure prevailing on an outlet side 26 of the pipeline and forwarded to the evaluation facility 14. A drive 27 is provided to actuate the valve. The sensor 25 can be dispensed with if the outlet side 26 of the pipeline is open on one side and atmospheric ambient pressure constantly prevails there. To diagnose the valve 21 and to monitor it for compliance with the permissible leakage resulting from its leakage class and its Kv value, the valve 21 is closed by corresponding activation of the drive 27. The pressure prevailing on the inlet side 20 is detected using the sensor 22 and compared in the evaluation facility 14 with a first reference value, the determination of which is described in more detail below with reference to FIG. 4. At the same time, the sensor 24 on the valve 21 is used to detect the solid-borne sound and compare the solid-borne sound level with a second reference value in the evaluation facility 14, the determination of the second reference value being described in more detail below with reference to FIG. 3. If the second reference value is exceeded, this indicates that the flow in the valve 21 has cavitation. If cavitation already occurs, even though the pressure on the inlet side 20 is below the first reference value, this means that the permissible leakage is exceeded and a corresponding message is output over a data interface 28 to initiate any necessary maintenance measures. If the installation conditions of the valve 21 in the pipeline permit, a pressure corresponding to the first pressure reference value is preferably set on the inlet side 20 and atmospheric pressure on the outlet side 26 for valve diagnosis purposes. If under such operating conditions the solid-borne sound level does not exceed the second reference value, the valve 21 complies with the threshold value for its leakage class and a "good" state is reported over the data interface 28. However if the solid-borne sound level does exceed the second threshold value, the message is output that the valve 21 has impermissibly high leakage.

In the graphical plot shown in FIG. 3, the solid-borne sound level in dB is shown over the differential pressure ratio Z, which is calculated according to the above-described formula. A curve pattern 30 of the solid-borne sound level has already been captured during the commissioning of a valve in the installed state and is therefore application-specific. A clear knee point 31 can be identified in the curve pattern 30 at $Z_{Cri}=0.75$, showing that above this differential pressure ratio the leakage flow through the valve has cavitation. The solid-borne sound level at the knee point is around 10 dB. The second reference value for the solid-borne sound level is set at this value, which is marked by a line 32, so that if the second reference value is exceeded by the measured solid-borne sound level, the presence of cavitation can be concluded. As mentioned above in the introduction, as the leakage increases, the knee point 31 in the curve 30 moves to the left. In other words, the value of the critical differential pressure ratio drops and cavitation can occur at lower pressure on the inlet side.

FIG. 4 shows an exemplary graphical plot of a characteristic curve field, with which the first pressure reference value can be easily determined. The Kv value of the valve is plotted logarithmically in m³/h on the abscissa, with the first reference value to be determined, referred to as P, in bar on the ordinate. A curve 41 shows the dependency of the required test pressure on the Kv value of the valve for leakage class II, a curve 42 for leakage class III and a curve 43 for leakage class IV. As already mentioned above, the permissible leakage in the respective leakage classes is 0.5%, 0.1% and 0.01% of the Kv value of the valve. In the example illustrated it is assumed for simplicity that a constant pressure of 1 bar prevails on the outlet side of the valve. The medium flowing through the valve is water at a temperature of 10° C. There is therefore a constant vapor pressure. If the pressure on the outlet side and the vapor pressure are also variables, they can be taken account of simply as parameters of the characteristic curve group. However, these pressures are not shown in FIG. 4 for purposes of clarity. For the instance shown in the diagram of a valve with the Kv value 10 m³/h and the leakage class IV, a first reference value to be set of 6.5 bar results according to the characteristic curve 43. For the same valve but with a leakage class III or II a test pressure of 5 bar or 4.2 should be selected. If the valve leakage exceeds the permissible value resulting in each instance from the leakage class, it is possible to detect a solid-borne sound level above the second reference value and therefore cavitation with a pressure on the inlet side, which is lower than the respective first reference value. The diagnostic system therefore allows reliable verification of the leakage class of valves.

Figure 5:
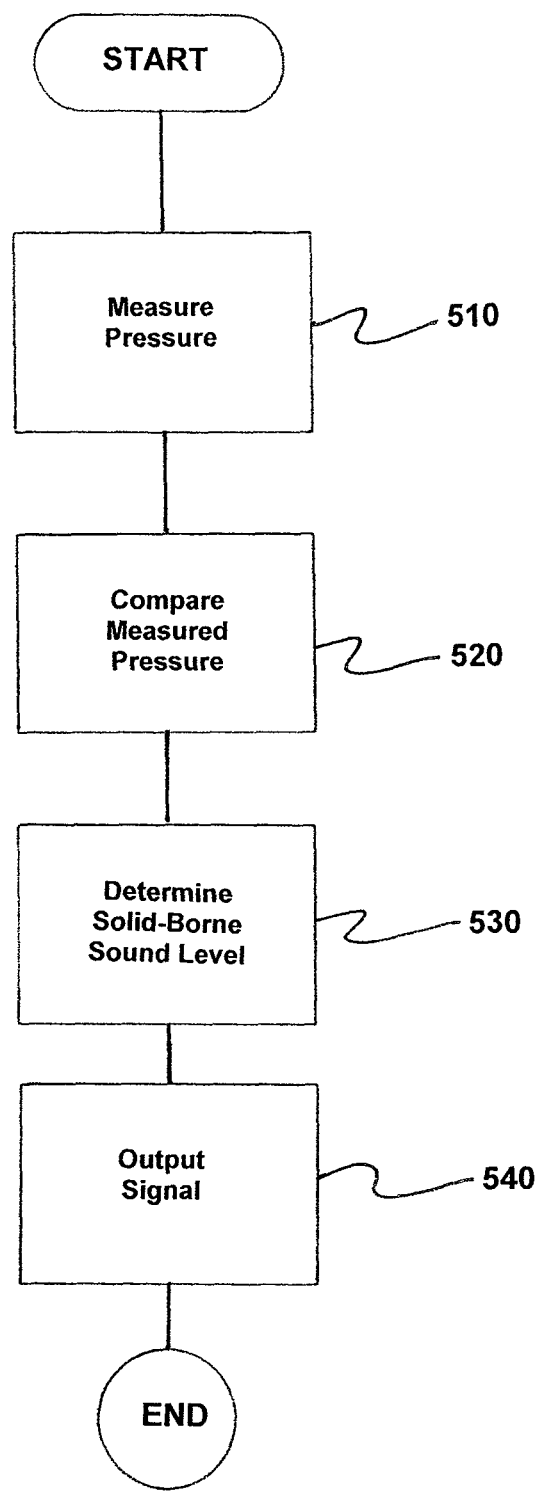
FIG. 5 is a flow chart of the method in accordance with an embodiment of the invention.

FIG. 5 is a flow chart illustrating a diagnostic method for a valve in accordance with the invention. Here, the valve is actuatable by a drive and is installed in a pipeline, having a first sensor for solid-borne sound and an evaluation facility for evaluating a recorded measurement signal of the solid-borne sound. The method comprises measuring, by a second sensor, a pressure in an inlet side of the pipeline, as indicated in step 510. Next, the measured pressure is compared with a first pressure reference value which is predetermined as at least a function of a valve size and a leakage class of the valve, as indicated in step 520. Here, the solid-borne sound level is determined and compared with a second predetermined reference value. The solid-borne sound level is determined at the first sensor and compared with a second predetermined reference value, as indicated in step 530. Next, a signal is output to indicate that a permissible leakage has been exceeded, if the determined sound level exceeds the predetermined second reference value and the measured pressure in the inlet side is lower than or equal to the first reference value, as indicated in step 540.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A diagnostic system for a valve which is actuatable by a drive and installed in a pipeline, comprising:
    a first sensor for detecting solid-borne sound;
    a second sensor for detecting a pressure in an inlet side of the pipeline; and
    an evaluation facility for evaluating a recorded measurement signal of the detected solid-borne sound, the evaluation facility being configured to, when the valve is closed, compare a pressure measured in the inlet side of the pipeline with a first pressure reference value, which is predetermined as at least a function of a valve size and a leakage class of the valve, determine a sound level of the solid-borne sound and compare the determined sound level with a second predetermined or predeterminable reference value, and to output a signal to indicate that a permissible leakage has been exceeded, if the sound level exceeds the second reference value and the pressure in the inlet side is lower than or equal to the first reference value.

2. The diagnostic system as claimed in claim 1, further comprising a storage unit, the first reference value being determined based on a characteristic curve field stored in the storage unit, the parameters of the stored characteristic curve field comprising at least a Kv value of the valve and a leakage class of the valve.

3. The diagnostic system as claimed in claim 1, wherein the second reference value is determined during commissioning as the value of the sound level essentially present during a transition from a turbulent flow to a flow having cavitation.

4. The diagnostic system as claimed in claim 2, wherein the second reference value is determined during commissioning as the value of the sound level essentially present during a transition from a turbulent flow to a flow having cavitation.

5. The diagnostic system as claimed in claim 1, wherein the valve comprises a closing valve or a control valve.

6. A diagnostic method for a valve, which is actuatable by a drive and installed in a pipeline, having a first sensor for solid-borne sound and an evaluation facility for evaluating a recorded measurement signal of the solid-borne sound, the method comprising:
  measuring, by a second sensor, a pressure in an inlet side of the pipeline;
  comparing the measured pressure with a first pressure reference value which is predetermined as at least a function of a valve size and a leakage class of the valve;
  determining, at the first sensor, the solid-borne sound level and comparing the determined solid-borne sound level with a second predetermined reference value; and
  outputting a signal to indicate that a permissible leakage has been exceeded, if the determined sound level exceeds the predetermined second reference value and the measured pressure in the inlet side is lower than or equal to the first reference value.

7. The diagnostic method as claimed in claim 6, wherein the first reference value is predetermined based on a characteristic curve field stored in a storage unit, parameters of which are at least a Kv value of the valve and the leakage class of the valve.

8. The diagnostic method as claimed in claim 6, wherein the second reference value is determined during commissioning as a value of the solid-borne sound level essentially present during a transition from a turbulent flow to a flow having cavitation.

9. The diagnostic method as claimed in claim 7, wherein the second reference value is determined during commissioning as a value of the solid-borne sound level essentially present during a transition from a turbulent flow to a flow having cavitation.

10. The diagnostic method as claimed in claim 7, wherein the Kv value of the valve is input into the evaluation facility, the leakage class of the valve is input into the evaluation facility, the first reference value is determined automatically by the evaluation facility based on a characteristic curve field, the pressure on an outlet side of the valve is set at 1 bar, the pressure on the inlet side of the valve is set at the first reference value, the sound level of the solid-borne sound is determined and compared with the second reference value and the signal is output to indicate that the permissible leakage has been exceeded, if the sound level exceeds the second reference value.

11. The diagnostic method as claimed in claim 9, wherein the Kv value of the valve is input into the evaluation facility, the leakage class of the valve is input into the evaluation facility, the first reference value is determined automatically by the evaluation facility based on a characteristic curve field, the pressure on an outlet side of the valve is set at 1 bar, the pressure on the inlet side of the valve is set at the first reference value, the sound level of the solid-borne sound is determined and compared with the second reference value and the signal is output to indicate that the permissible leakage has been exceeded, if the sound level exceeds the second reference value.

12. The diagnostic method as claimed in claim 6, wherein the valve comprises a closing valve or a control valve.

* * * * *